(12) United States Patent
De Vries et al.

(10) Patent No.: US 10,314,110 B2
(45) Date of Patent: Jun. 4, 2019

(54) ELECTROCHEMICAL DESCALING BY PULSED SIGNAL REVERSAL

(71) Applicant: KONINKLIJKE PHILIPS N.V., Eindhoven (NL)

(72) Inventors: Johannes Hotze Bernhard De Vries, Eindhoven (NL); Ytsen Wielstra, Eindhoven (NL); Bernardo Arnoldus Mulder, Eindhoven (NL); Nienke Cornelie De Vries-Arentsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 777 days.

(21) Appl. No.: 14/779,117

(22) PCT Filed: Mar. 27, 2014

(86) PCT No.: PCT/IB2014/060204
§ 371 (c)(1),
(2) Date: Sep. 22, 2015

(87) PCT Pub. No.: WO2014/162245
PCT Pub. Date: Oct. 9, 2014

(65) Prior Publication Data
US 2016/0057810 A1     Feb. 25, 2016

Related U.S. Application Data

(60) Provisional application No. 61/807,364, filed on Apr. 2, 2013.

(51) Int. Cl.
*F24D 19/00* (2006.01)
*F24H 9/00* (2006.01)
(Continued)

(52) U.S. Cl.
CPC .......... *H05B 1/02* (2013.01); *A47J 27/21025* (2013.01); *A47J 31/60* (2013.01);
(Continued)

(58) Field of Classification Search
None
See application file for complete search history.

(56) References Cited

U.S. PATENT DOCUMENTS 4,036,716 A * 7/1977 Hulthe ................ C02F 1/46104
                                                                       205/729
4,357,524 A    11/1982 Apfelbeck
(Continued)

FOREIGN PATENT DOCUMENTS

CN      101085683 A    12/2007
EP      2036865 A1     3/2009
(Continued)

*Primary Examiner* — Joseph M Pelham

(57) ABSTRACT

The invention provides a heater arrangement and method for heating a liquid, wherein the heater comprises a heating element, wherein the method comprises (i) heating the liquid in the heater wherein the heating element is in contact with the liquid, and (ii) applying a potential difference between the heating element and a counter electrode, wherein the potential difference has an AC component whereby the potential difference varies with an AC frequency in the range of 0.01-100 Hz and wherein the potential difference is applied with a cycle time, wherein the potential difference has a sign during a first part of the cycle time that is opposite of the sign of the potential difference during a second part of the cycle time, and wherein during one or more of the first part of the cycle time and the second part of the cycle time, the potential difference temporarily changes sign.

18 Claims, 7 Drawing Sheets

(51) Int. Cl.
*C02F 1/46* (2006.01)
*H05B 1/02* (2006.01)
*H05B 3/78* (2006.01)
*F24H 1/20* (2006.01)
*F24H 1/00* (2006.01)
*F24H 1/10* (2006.01)
*A47J 31/60* (2006.01)
*A47J 27/21* (2006.01)
*C02F 1/461* (2006.01)
*C23F 13/20* (2006.01)

(52) U.S. Cl.
CPC .......... *C02F 1/4602* (2013.01); *C02F 1/4618* (2013.01); *C23F 13/20* (2013.01); *F24D 19/0092* (2013.01); *F24H 1/0018* (2013.01); *F24H 1/101* (2013.01); *F24H 1/106* (2013.01); *F24H 1/202* (2013.01); *F24H 9/0047* (2013.01); *H05B 1/0269* (2013.01); *H05B 3/78* (2013.01); *C02F 2201/4613* (2013.01); *C02F 2201/46155* (2013.01); *C02F 2201/46175* (2013.01); *C02F 2303/08* (2013.01); *C02F 2303/22* (2013.01); *C02F 2307/12* (2013.01); *F24D 2200/08* (2013.01); *F24H 2250/02* (2013.01); *F24H 2250/10* (2013.01); *H05B 2203/021* (2013.01)

(56) References Cited

U.S. PATENT DOCUMENTS

| | | | |
|---|---|---|---|
| 6,365,881 B1* | 4/2002 | Itzhak | A47J 27/21025 219/481 |
| 2009/0038944 A1* | 2/2009 | Kruger | C02F 1/4602 204/555 |
| 2011/0299840 A1* | 12/2011 | Wielstra | C23F 13/04 392/497 |
| 2013/0089310 A1* | 4/2013 | Wielstra | F22B 1/30 392/457 |
| 2013/0114947 A1* | 5/2013 | Wielstra | C02F 1/4602 392/500 |
| 2014/0138247 A1* | 5/2014 | Aanensen | C02F 1/4602 204/571 |
| 2016/0047557 A1* | 2/2016 | De Vries | C02F 1/4602 134/1 |
| 2016/0057810 A1* | 2/2016 | De Vries | C02F 1/4602 392/457 |

FOREIGN PATENT DOCUMENTS

| | | |
|---|---|---|
| JP | 2003235399 A | 8/2003 |
| JP | 2003260495 A | 9/2003 |
| JP | 2007021338 A | 2/2007 |
| WO | 2006067695 A2 | 6/2006 |
| WO | 2010055472 A2 | 5/2010 |
| WO | 2012011026 A2 | 1/2012 |
| WO | 2012011051 A1 | 1/2012 |

* cited by examiner

ELECTROCHEMICAL DESCALING BY PULSED SIGNAL REVERSAL

This application is the U.S. National Phase application under 35 U.S.C. § 371 of International Application No. PCT/IB2014/060204, filed on Mar. 27, 2014, which claims the benefit of U.S. Provisional Application 61/807,364 filed Apr. 2, 2013. These applications are hereby incorporated by reference herein.

FIELD OF THE INVENTION

The invention relates to a method for heating a liquid, especially water, a (water) heating arrangement for applying such method as well as to an electronic device comprising such (water) heating arrangement.

BACKGROUND OF THE INVENTION

Water heating devices are applied in all kind of applications, such as steam irons, electric kettles, hot drink vending machines, etc. A problem with such devices is that scale may form on the heating elements that are in contact with the water.

During operation of for instance a steam generation device, water is supplied to a part of the water infrastructure where it is heated, such as in the (external) boiler of a system iron, as a consequence of which scale may be formed. If the scale is not (periodically) removed clogging up may occur, as a result of which the performance of the steam generation device may decrease and, eventually, the steam generation device may not be fit to be used anymore.

Hard water containing significant amount of Ca2+ and HCO3− (bicarbonate) may form scale (CaCO3) upon temperature increase via the following chemical reaction:

$$Ca(HCO3)2 \rightarrow CaCO3 + H2O + CO2$$

Especially boiling water will separate scale, the scale will form in the water but also on the heating element itself as it has the highest temperature. In time scale will grow on the heating element and when internal stresses increase it will break loose from the element. Several treatments of water to prevent scaling have been claimed in the literature. A well known method is the use of ion exchangers were $Ca^{2+}$ is exchanged for $Na^+$ or $H^+$. A second well known method is the use of phosphonate that in small amount is added to the water and inhibits the formation of seeding crystals in the hard water, effectively preventing the growing of crystals and thus the formation of scale.

In the former a cartridge needs to be used with the ion exchange resin inside. After depletion the cartridge needs to be regenerated or replaced with a new one. In the latter case continuously phosphonate needs to be added as the phosphonates have limited stability at pH 7-8.5, the pH of hard water. The continuous addition can be implemented for example by using a hard-pressed tablet that very slowly liberates the phosphonates into the water. This way of working has been used in prior art steam irons. However, chemicals are added into the water which may be a drawback, for instance when water is (also) meant to be potable.

Physical methods to prevent scale formation have also been claimed but these may have a less clear working principle and the efficacy may sometimes even be doubtful in some cases. For example the use of (electro) magnets placed on water tubing for scale prevention is an example of a poorly understood and non-repeatable scale prevention method.

Also WO2012011026 and WO2012011051 describe methods to prevent scaling.

SUMMARY OF THE INVENTION

Hence, it is an aspect of the invention to provide an alternative method to prevent or reduce scaling in a water heater and/or an alternative water heater arrangement, which preferably prevents or at least partly obviates one or more of above-described drawbacks and/or relatively more complicated constructions or solutions of the prior art. It is especially an aim of the invention to prevent or reduce the formation of scale on heating elements (such as a heatable wall or an immersion heater) in heating appliances and/or to decalcify calcified surfaces of such heating elements.

Here, electrochemical scale prevention and/or removal from an (aqueous) liquid such as water is proposed. A principle could be to have two electrodes in the water connected with a DC power supply. At the anode (+ electrode) oxidation is taking place. At the cathode (− electrode) reduction is taking place; in practice this means that at the cathode water is reduced:

$$2H_2O + O_2 + 4e^- \rightarrow 4OH^-$$

The formation of $OH^-$ will increase pH locally and transform the $HCO_3^-$ into $CO_3^-$. The $CO_3^-$ will react with the $Ca^{2+}$ and calc will precipitate on the cathode.

At the anode oxidation takes place. When the anode material is oxidation resistant then water is oxidized towards oxygen and acid. The acid will dissolve calc that has been deposited on the electrode and the electrode will remain clean when used in heated (hard) water:

$$2H_2O \rightarrow O_2 + 4H^+ + 4e^-$$

When the anode is reactive it may be oxidized. For example metal anodes will dissolve unless very stable metal (Pt), certain transition metal oxides or carbon anodes are used. Calcified steel can be decalcified by applying a positive voltage but its effect is limited by the corrosion resistance of the metal making only small voltages/currents feasible.

In summary, such simple setup may remove scale from the water by depositing it on a cathode and keeping the (oxidation resistant) anode clean. A drawback, besides the need for corrosion resistant anode material, may be that the cathode needs to be cleaned at regular intervals.

It was found that scale (i.e. calcium carbonate ("calc") formation) can be prevented by applying an AC signal onto two electrodes of which one is a heating element. By continuous reversal of the signal the heating element is alternating an anode or cathode. This means that alternating acid and base is generated at the surface of the heating element effectively weakening the adhesion of scale on to the heating element.

The basic idea behind the AC signal is that corrosion is suppressed by preventing metal ions to move from the electrode into solution. When the signal is positive, metal ions tend to leave the electrode into the water (corrosion). When the signal is sufficiently fast reversed the metal ions are pulled back to the electrode. When the reversal is fast enough ions cannot escape the boundary layer at the metal surface and corrosion is prevented.

Although the addition of a high frequency signal can suppress the corrosion of a single low frequency AC signal there is a drawback. The second AC signal needs to have certain amplitude to be effective. That means that when for example the amplitudes of both AC signals are equal that at the peak of the low frequency signal the amplitude is modulated by the second frequency bringing it down to 0V in the minimum but doubles it at the maximum (see below). The doubling of the amplitude can then result again in corrosion in spite of the second AC signal being present that could have prevented this corrosion due to the peak amplitude exceeding corrosion threshold.

Furthermore one should note that in this example at the peak of the low frequency signal thus where the highest risk of corrosion is, the signal is only reversed to 0V. In reality this means that tweaking the right signal for a water heating device to prevent scale formation and corrosion is rather cumbersome as not only frequencies have to be chosen right but also the amplitudes (including an optional DC). Sufficient amplitude is needed for scale prevention but at the peaks the amplitude should not cross a certain threshold where the boundary layer at the electrode is destroyed and corrosion sets in.

It was surprisingly found that it is possible to overcome the drawbacks of the prior art by modulating an AC signal with a pulse instead of with an AC signal that reverses the signal at a certain frequency. The first benefit is that it is now possible to fully reverse the signal thus enhancing the restoration of the boundary layer at the surface of the metal electrode without adding additional amplitude. The second benefit is that the low frequency signal can now be easier tweaked for sufficient acid formation while the pulse frequency prevents corrosion without adding amplitude: the two processes (scale prevention and corrosion prevention) can now be separated more easily from each other than with superimposed AC signals. It is clear that pulse frequency can be modified but also the duty cycle of the pulse can be varied.

Hence, in a first aspect the invention provides a method for heating a liquid in a heater, wherein the heater comprises a heating element, wherein the method comprises (i) heating the liquid in the heater wherein the heating element is in contact with the liquid, and (ii) applying a potential difference (V), especially of at least 1 V, between the heating element and a counter electrode, wherein the potential difference (V) has an AC component whereby the potential difference varies with an AC frequency (f) in the range of 0.01-100 Hz and wherein the potential difference is applied with a cycle time (T) and a duty cycle (D), wherein the potential difference has a sign during a first part of the cycle time that is opposite of the sign of the potential difference during a second part of the cycle time, and wherein during one or more of the first part of the cycle time and the second part of the cycle time, the potential difference temporarily changes sign.

Therefore, the invention provides a method wherein during or after heating a liquid, the heating element is subject to a fluctuating potential difference, wherein this fluctuation has a relative slow component, which is in the order of 0.01-100 Hz, especially 0.1-50 Hz, but within the cycles, the potential is temporarily changed in sign, and optionally also in absolute value. Hereby, temporarily, the sign of the potential at the heating element (and while being in contact with a (hot) aqueous liquid, especially water) is changed from + to minus, or vice versa.

It surprisingly appears that with this solution, scaling can substantially be prevented and/or removed and corrosion can be prevented. When an alternating current (AC) is supplied to the electrodes, alternating acid and base will be formed at the electrodes. While scale is formed during boiling it will substantially not adhere to the electrode walls as it is constantly dissolved and re-precipitated at the electrode surface. The method can also be used to decalcify already calcified surfaces.

Note that each cycle, as the potential difference follows an AC scheme, has a positive and a negative part. During a first part of the cycle time the potential difference is opposite in sign from a second part. In general, the cycle consists of a first part with a positive or negative sign, and a second part with a negative or positive sign, respectively. For instance, during the first part of the cycle time, the heating element is the anode, and during the second part of the cycle time, the heating element is the cathode. With the invention, during the first or the second cycle, temporarily, the potential difference changes sign. For instance, during the first part of the cycle time the heating element is the anode, but for a (short) time period within the first part of the cycle time, the heating element changes to being a cathode, and changes again back to being the anode. After the first part, the heating element is then the cathode, though again, temporarily this may change (then) to anode. Hence, within such first part and/or within such second part, the sign of the potential difference is temporarily changed ("reversal") (i.e. has within one of these parts temporarily the same sign as the other part). Optionally, also the absolute value may be changed. After such temporary change of the potential difference, the potential difference follows the general AC scheme. Hence, assuming the AC component to follow a periodical function f(t), the temporary change leads to a value mf*f(t), wherein mf is the modulation factor, which is in general smaller than zero (see also below). The term cycle may especially refer to the time 1/f, i.e. the inverse frequency.

The invention includes embodiments wherein only during the first part of the cycle time, or only during the second part of the cycle time, or during both the first part of the cycle time and the second part of the cycle time, or randomly distributed over the first part of the cycle time and the second part of the cycle time, such temporary change of the AC scheme, such as in the form of a pulse width modulation, takes place. The invention also includes embodiments wherein during application of the potential difference as defined herein the potential difference temporarily changes sign in 10-100% of the cycles. Hence, not all cycles necessarily include such temporary modification. Especially at higher frequencies, this may not be necessary for all cycles. In general however, during one or more of the first part of the cycle time and the second part of each cycle time, the potential difference temporarily changes sign. The temporary change may have a frequency, herein also indicated as pulse frequency (fp), which may especially be in the range of 50-2500 Hz. Especially, the pulse frequency and the frequency (f) of the AC voltage (component) have a relation fp/f>2.

The temporary change of the sign or reversal may be accompanied with a change in the absolute value. Hence, in an embodiment during one or more of the first part of the cycle time and the second part of the cycle time, the potential difference temporarily changes sign and absolute value. The reversal may be 100%, but may also be smaller, or optionally also be larger. With a 100% reversal, a modulation factor (mf) of the AC potential difference (during the temporary change) is −1. However, this modulation factor may be smaller (or optionally larger). In an embodiment, −2.5≤mf<0, such as especially −1.1≤mf<0, like even more especially −1.0≤mf<0.

Optionally, part of the signal may also be modulated with a modulation factor 0≥mf≥2.5, such as 0≥mf≥1.1, especially $0 \geq mf \geq 1.0$. This may be a further advantageous modulation, but does not contribute to a change in sign.

Due to the temporary change of sign of the potential difference, the duty cycle of a cycle wherein such temporary change takes place is lower than 100%. Especially, the duty cycle is in the range of 5-95%, such as even more especially 35-65%. Again, the value of the duty cycle may in principle differ between a first part of the cycle and the second part of the cycle. The term "duty cycle" is known in the art, and especially relates to the percent of time that an entity spends in an active state as a fraction of the total time under consideration. For instance, when an AC potential has a sinusoidal shape, and the signal follows this sine, the duty cycle is 100%. Would however during 25% of the time the signal be zero, or e.g. have an opposite signal (to the situation wherein the signal would follow the sine), the duty cycle would be 75%.

In a specific embodiment, a pulse width modulated AC potential difference is applied. Hence, the invention also provides a method for heating a liquid in a heater, wherein the heater comprises a heating element, wherein the method comprises (i) heating the liquid in the heater wherein the heating element is in contact with the liquid, and (iia) applying an AC potential difference between the heating element and a counter electrode, the AC potential difference having an AC frequency (f) in the range of 0.01-100 Hz, especially 0.1-50 Hz, cycle time, and duty cycle, and (iib) applying a pulse modulation to the AC potential difference with a pulse frequency (fp) in the range of 50-2500 Hz, wherein fp/f>2, wherein the pulse modulation is chosen to modulate the amplitude of the AC signal with (i) a modulation factor (mf) in the range of $-2.5 \leq mf<0$, especially $-1.1 \leq mf<0$, and with (ii) a duty cycle (D) in the range of $5\% \leq D \leq 95\%$, such as 35-65%.

The mobility of ions (in the liquid to be heated or being heated) depends on the temperature. In water heating systems operated at relative low power the mobility is relative low. When a heater is operated under pressure and at high power like for example in a (flow through) heater of e.g. an espresso coffee machine the mobility is relative high. It appears that the higher the operating temperature the more symmetric the electrical signal may be to be to prevent corrosion. An additional DC signal may be low or even zero when the heater is operated at high temperature. At high temperatures, such as equal to or over 120° C. (i.e. of the heating element that is in contact with the liquid), the signal may especially be relative symmetrical with duty cycle of the pulse being e.g. 35-65%, such as especially about 50% while also the pulse frequency may be sufficiently high to prevent corrosion at the elevated temperature, such as in the range of 0.5-2000 Hz.

As indicated above, due to the temporary change of the potential difference, the duty cycle is below 100%. The extend of reversal may differ for the first part of the cycle (time) and the second part of the cycle (time), and even between cycles. Especially, during one or more of the first part of the cycle time and the second part of the cycle time the duty cycle is in the range of 35-65%.

As indicated above, the AC potential difference frequency is especially in the range of 0.1-50 Hz. Further, the potential difference ((AC) voltage) may especially be in the range of 1-5 V, such as at least 1.2 V, like 1.5-5 V, such as especially 1.5-4 V. The heating element may especially be used to heat the liquid to a temperature close to the boiling temperature (of the liquid). In an embodiment, the method may include heating the heating element to a temperature in the range of 120-250° C. Further, fp/>f5, even more especially fp/f>10. In a further embodiment, fp/f<2500.

In yet further embodiments, the method may comprise heating the heating element to a temperature in the range of 120-250° C., like in the range of 140-200° C. Under the conditions described herein, this may imply that water may be heated to a temperature in the range of about 80-110° C., especially about 85-100° C. The heating element may especially be used to heat the liquid to a temperature close to the boiling temperature (of the liquid). Further, the liquid may be heated under elevated pressure, i.e. a pressure above 1 bar. Hence, in an embodiment the liquid in contact with the heating element is (brought) at a pressure in the range of 1-12 bar, especially 1-10 bar. In some instance, the pressure may be in the range of 7-12 bar, like 7-10 bar. To this end, the heater arrangement may further comprise a device configured to impose a pressure to the liquid, especially a pressure larger than 1 and equal to or below 12 bar, such as in the range of >1 bar and ≤10 bar, like e.g. 7-10 bar. For instance, such device may be a pump, such as known to the person skilled in the art. In specific embodiments, the (hot) liquid has a temperature in the range of 0.25-20° C. less than the boiling temperature, such as 1-15° C. less than the boiling temperature. Hence, at least part of the heating element may thus be in contact with liquid with such temperature, during at least part of the operating time. Hence, in an embodiment, the invention also involves a method wherein the liquid is heated with the heating element to a temperature in the range of 0.25-20° C. less than the boiling temperature, such as 1-15° C. less than the boiling temperature.

The liquid may be heated in a vessel in a stationary way. Alternatively, the liquid may flow along the heating element. Hence, in an embodiment the method may further comprise flowing the liquid along the heating element, especially with a flow speed in the range of 1.5-10 ml/s, such as in the range of 2-3.5 ml/s or 4.5-7 ml/s. In a specific embodiment, the method may thus comprise flowing the liquid between the heating element and the counter electrode with a flow speed in the range of 1.5-10 ml/s, such as in the range of 3-6 ml/s, like 4-6 ml/s. Therefore, in an embodiment the heater is configured to flow the liquid between the heating element and the counter electrode. In a further specific embodiment, the heater comprises a flow through heater, wherein the heating element encloses the counter electrode. In yet a further specific embodiment, the heating element and the counter electrode have a mutual (shortest) distance (d2) in the range of 0.5-5 mm.

In alternative embodiments, the heater comprises a flow through heater, wherein the counter electrode encloses the heating element. In yet other embodiments, both the heating element and counter electrode are configured to heat the liquid (the counter electrode thus comprising a second heating element).

Especially beneficial is the use of AC signals that have a sinusoidal or triangular or block shape. In that case the time the current is at its peak is shorter then compared to e.g. sinusoidal or block-shape waves reducing the risk of corrosion. The signal can be generated in several ways, as know to the person skilled in the art. Amongst others, an H-bridge, or H-bridge approach may be applied. The signal may also be generated on the basis of software with which the signal can be defined. For instance, a micro controller can be used to generate the signal.

Application of the AC voltage may be before, during, or after heating of the (aqueous) liquid. Preferably, the AC voltage is applied during heating of the (aqueous) liquid.

The phrase "applying a AC voltage between the heating element and a counter electrode" and similar phrases relate to the embodiment(s) that the heating element and the counter electrode are both in contact with the (aqueous) liquid. Hence, the phrase "applying a AC voltage between the heating element and a counter electrode" refers to "applying a AC voltage between the heating element and a counter electrode, while the heating element and the counter electrode are in contact with the (aqueous) liquid. The phrase "in contact" include embodiments wherein at least part of the item is in contact. For instance, at least part of the heating element or at least part of the counter electrode may be in contact with the (aqueous) liquid, respectively. Especially, the heating element can be earthed (grounded).

Herein, the liquid is especially water (though other aqueous liquids may also be heated with the method and heater arrangement as described herein). The method may be used for hard and soft water, especially for water having a water conductivity of preferably at least 100 µS/cm.

The heating element can be immersed directly in the water or be arranged as (part of a) wall of the heater. In both cases the heater element (wall) acts as electrode and is electrically connected to the counter electrode. The (surface of the) heating element is thus in contact with the (aqueous) liquid in the heater. This is herein also indicated by the phrase "wherein the heating element is in contact with the (aqueous) liquid". Note that the term heating element thus refers to that part (element) that is in contact with the (aqueous) liquid and provides (when using the heater to heat the (aqueous) liquid) the heat from the heater to the (aqueous) liquid. It is on the heating element (or more especially its (part of the) surface that is in contact with the (aqueous) liquid) that scale may deposit. The term "heating element" may thus not necessarily refer to the actual heat generation device that generates the heat, but refers to that part/element, that transfers the heat to the (aqueous) liquid. In an embodiment, the term "heating element" may also refer to a plurality of heating elements.

The heating element for heating the (aqueous) liquid herein preferably comprises one or more metal parts for heating the liquid or is essentially from metal, such as a steel wall or a steel immersion heater. Hence, the heating element is herein also indicated as metal heating element. On this metal of the heating element that is in contact with the (aqueous) liquid, scale may deposit. Preferably, the heating element for heating the (aqueous) liquid herein preferably comprises one or more steel parts for heating the liquid or is essentially from steel. Hence, the heating element, or the part of the heating element in contact with the water is preferably made of steel (though other materials may also be possible). In a specific embodiment, the heating element is a steel heating element.

The term "counter electrode" may in an embodiment also refer to a plurality of counter electrodes. For instance, when more than one signal is applied, in principle different counter electrodes may be applied. In an embodiment, the applied signals are applied on separate counter electrodes wherein thus the counter electrode comprises a plurality of counter electrodes, and wherein the AC voltage is applied between the heating element and a first counter electrode, and wherein a second AC voltage is applied between the heating element and a further counter electrode Especially when two or more AC signals are applied, it may be an option to use for each AC signal a different counter electrode.

The counter electrode may for instance be a stainless steel or a mixed metal oxide (MMO), a carbon based or a platinum electrode. Where the wall of the heater is used as counter electrode, preferably the counter electrode is of metal, more preferably of steel. The term "steel" herein especially refers to stainless steel. Any grade of stainless steel can be applied. Preferably the steel contains both Cr and Ni (e.g. grade 304) while additional presence of small amounts of Mo is especially beneficial (e.g. grade 316 or higher).

The term "heater" is used to indicate a device that is arranged to heat a liquid, such as water. The heater especially relates to a water heater. The term "water heater" is used to indicate a device that is arranged to heat an (aqueous) liquid, such as water. The term "water heater" (herein shortly indicated with "heater") may for instance refer to a steam generation chamber (based on heating an (aqueous) liquid). The heater may be of the flow through heater type. The heater may for instance heat the (aqueous) liquid in an embodiment via a heat generation device connected to the heater wall, wherein the wall (which is in contact with the (aqueous) liquid), is the heating element (for heating the (aqueous) liquid), or may for instance in an embodiment heat via an element in the (aqueous) liquid, such as water, such as in the case of an immersion type of heater (in which the heating element is in contact with the (aqueous) liquid), etc. Different types of heating elements may be applied (at the same time). The term "(water) heater" may also refer to a (closed) boiler arranged to produce steam, to a (closed) boiler arranged to produce heated water, to a flow through heater or to a steamer. In a specific embodiment, the heater arranged for heating an (aqueous) liquid is selected from the group consisting of a flow through heater (see also below), a flow through steamer, a heater for heating water and a heater for producing steam. Further, the heater may also be configured to provide heated water and steam. Included are also heater blocks where the heating element and e.g. the tube that carries the water are embedded in a block of aluminum.

Heating may be any heating at temperatures above room temperature, but especially refers to heating (of the (aqueous) liquid) above 50° C., such as especially heating the (aqueous) liquid in the heater to a temperature of at least 85° C. The term heating may thus include bringing at elevated temperatures, boiling and/or producing steam.

The heater may be any heater, such as a heater of a steam generation device (e.g. as used for a pressurized steam generator (sometimes also indicated as system iron)) for providing steam, a water heater for providing hot drinking water like in a hot liquid vending machine (e.g. for making coffee, tea, cappuccino, or hot chocolate, etc.), an electric kettle, a coffee maker (drip filter), an espresso machine, a pad coffee machine, a boiler (for internal heating of a house (domestic boiler) or of an apartment, an office building), an industrial boiler etc.), a water heater arranged in a washing machine or in a dish washer, or a hot-water based weed killing device (or sprayer) (arranged to providing hot water to kill weed).

The invention also provides an arrangement with which the method of the invention may be applied. The invention therefore provides in an embodiment a (water) heater arrangement comprising a (water) heater arranged for heating an (aqueous) liquid, the (water) heater comprising a heating element to heat the (aqueous) liquid in the (water) heater, the heating element arranged to be in contact with the (aqueous) liquid, and an electrical power supply, arranged to apply the AC voltage between the heating element and a counter electrode. Hence, the heater arrangement may execute the herein described method.

Hence, the invention further provides a (water) heater arrangement comprising a (water) heater, arranged for heating a liquid, comprising a heating element to heat the liquid in the (water) heater, the heating element arranged to be in contact with the liquid, and an electrical power supply (arranged to apply the AC voltage between the heating element and a counter electrode), wherein the (water) heater arrangement is configured to apply a potential difference between the heating element and a counter electrode, wherein the potential difference has an AC component whereby the potential difference varies with an AC frequency (f) in the range of 0.01-100 Hz and wherein the potential difference is applied with a cycle time and a duty cycle, wherein the potential difference has a sign during a first part of the cycle time that is opposite of the sign of the potential difference during a second part of the cycle time, and wherein during one or more of the first part of the cycle time and the second part of the cycle time, the potential difference temporarily changes sign.

In a specific embodiment, the water heating arrangement is configured to apply an AC potential difference between the heating element and a counter electrode, the AC potential difference having an AC frequency (f) in the range of 0.01-100 Hz, cycle time, and duty cycle, and configured to apply a pulse modulation to the AC potential difference with a pulse frequency (fp) in the range of 50-2500 Hz, wherein fp/f>2, wherein the pulse modulation is chosen to modulate the amplitude of the AC signal with (i) a modulation factor (mf) in the range of $-2.5 \leq mf<0$ and with (ii) a duty cycle in the range of $5\% \leq D \leq 95\%$ (see also above).

In yet a further embodiment, the heater is configured to flow the liquid between the heating element and the counter electrode, and wherein the heater comprises a flow through heater, wherein the heating element encloses the counter electrode (see however also above). Flow through heaters are amongst others described in WO2006/067695 and WO2010/055472, which are incorporated herein by reference.

Hence, in a further aspect, the invention provides an electronic device comprising such heating arrangement wherein the electronic device is arranged to produce heated water and/or steam. Especially, the electronic device may in an embodiment be selected from the group consisting of an iron, a pressurized steam generator, a non-pressurized steam generator (sometimes also indicated as a garment steamer), a hot liquid vending machine, an electric kettle, a coffee maker (drip filter), an espresso machine, a pad coffee machine, a washing machine, a dish washer, and a hot-water based weed killing device (sprayer). The hot liquid vending machine may e.g. relate to a coffee maker, an espresso machine, a pad coffee machine, a hot chocolate machine, a hot chocolate pad machine, a soup machine, a hot tea machine, and vending machine that may have two or more of such functionalities. Hence, the invention especially further provides an electronic device for providing a beverage comprising a liquid at elevated temperature, the electronic device comprising a (water) heater arrangement according as defined herein, wherein the electronic device is arranged to produce heated water and/or steam for the beverage. Such beverage may be coffee, thee, espresso, and hot chocolate. In an embodiment, the electronic device or vending machine may optionally also be able to produce one or more of an espresso macchiato, espresso con panna, caffè latte, flat white, caffè breve, cappuccino, caffè mocha, americano, latte macchiato, red eye, café du lait, ristretto, espresso dopio, café crème, pepresso, etc. etc.

In yet a further aspect, the invention also provides the use of a combination of (i) an AC voltage and (ii) a temporary change of sign during one or more of a first part and a second part of a cycle of the AC voltage to a heating element of a water heater arranged for heating an aqueous liquid to prevent or reduce scaling of the water heater.

As mentioned above, the herein defined AC voltage is preferably applied during heating of the (aqueous) liquid in the heater with the heating element. This may have the most impact in preventing and/or reduction of scaling on the heating element.

In an embodiment, the method further includes a measurement of the conductivity of the (aqueous) liquid, and optionally of other parameters, and optionally controlling the AC voltage and optionally the temporary change of the potential difference in dependence of the measurement and a predefined relations between the conductivity (and the optional other parameters) and the AC voltage and optionally the temporary change of the potential difference. One or more optional other parameters that may be measured may be selected from the group consisting of the temperature of the (aqueous) liquid, the pH of the (aqueous) liquid, the current that is running (between the heating element and the counter electrode), the voltage drop when connecting the two electrodes (i.e. the heating element and the counter electrode), etc. Especially, the method may involve controlling one or more of the potential difference, AC frequency (f), and (optionally the) duty cycle, as function of one or more of (i) a current between the heating element and the counter electrode, and (ii) an electrical conductivity of the liquid. Especially, the current between the heating element and the counter electrode is measured. The current and/or the conductivity measurement(s) may give information about the chemical processes that occur.

Typically, the current density (i.e. between the heating element and the counter electrode) is in the range of 0.1-10 mA/cm$^2$, especially 0.1-5 mA/cm$^2$, such as especially 0.2-0.6 mA/cm$^2$, when using a flat heating element or a spiral shaped heating element in a boiler system, or especially 0.2-5 mA/cm$^2$ for a flow through heater.

The electrical power supply can be any system that is able to generate a AC voltage and the temporary change of the potential difference. Optionally, one or more of the frequency of the AC, the peak to peak voltage of the AC, the frequency of the temporary change, the peak to peak voltage of the temporary change, are variable and controllable, for instance one or more may be controlled in relation to a parameter like electric conductivity of the liquid and/or temperature of the liquid, or the current that is running. The term electrical power supply may in an embodiment also refer to a plurality of electrical power supplies. In principle, each voltage may be generated by a different electrical power supply.

The application of the voltage (i.e. potential difference) may be applied preferably permanently during the time the (aqueous) liquid is at elevated temperatures, but may in an embodiment also be applied periodically. Optionally, the voltage is applied before or after heating of the (aqueous) liquid. However, best results are obtained when the voltage is applied at least during heating of the (aqueous) liquid.

Especially, the water conductivity is in the range of 100-50,000 µS/cm and the water temperature is in the range of 50° C.—boiling temperature; especially ≥85° C.

The term "substantially" herein, such as in ""substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The term "and/or" especially indicates "one or more of". The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
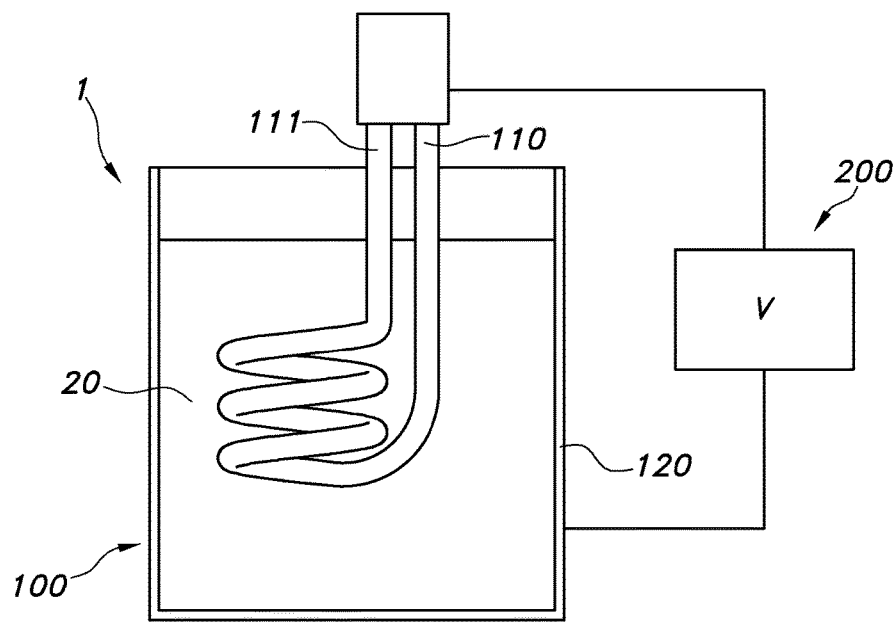
FIGS. 1a-1d schematically depict some possible configurations of a heater arrangement where the heating element is immersed in the water or where the heating element is a wall of a (water) heater.

FIG. 1a schematically depicts a (water) heater arrangement ("heater arrangement") 1 comprising a (water) heater ("heater") 100, arranged for heating an (aqueous) liquid 20. The (aqueous) liquid 20, especially water, is contained in the heater 100. The heater 100 comprises a metal heating element 110 to heat the (aqueous) liquid 20 in the heater 100. The heater arrangement 1 further comprises an electrical power 200 supply, arranged to apply a AC voltage between the heating element 110 and a counter electrode 120. In addition to the AC voltage a second, lower frequency AC voltage may be added and/or a DC voltage. When a DC voltage is applied, the heating element 110 is chosen as positive electrode. By application of the voltage(s), the metal heating element 110 is protected against scaling and/or scaling formed may be removed. FIG. 1a schematically depicts an embodiment wherein the heating element 110 is a submerging/immersion heating element, indicated with reference 111. The wall (or at least part of it) of the heater 100 is used as counter electrode in this embodiment. The wall may for instance be of steel as conductive material. Typically stainless steel is used with Cr, Ni as alloying elements (e.g. 304) or with additional Mo added (e.g. 316).

Figure 1B:
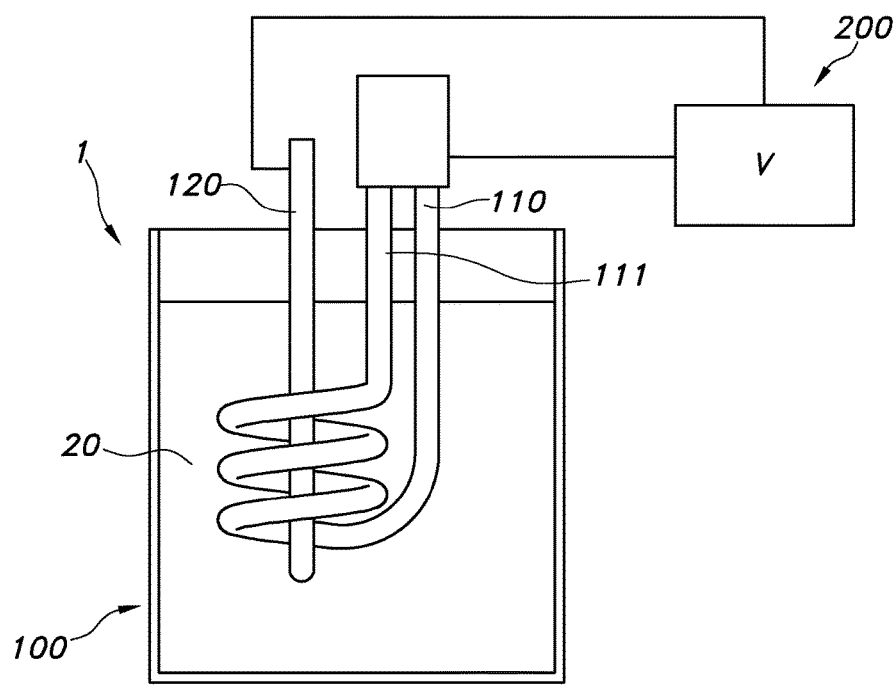

FIG. 1b schematically depicts a heater arrangement 1 wherein the heating element 110 is a curled immersed heating element, and wherein the counter electrode 120 is partly surrounded by at least part of the submerging heating element 111. In this case the counter electrode can be of stainless steel or Inconel or other oxidation resistant electrode material like titanium, platinum, mixed metal oxide coated titanium, platinum coated titanium or carbon based.

Figure 1C:
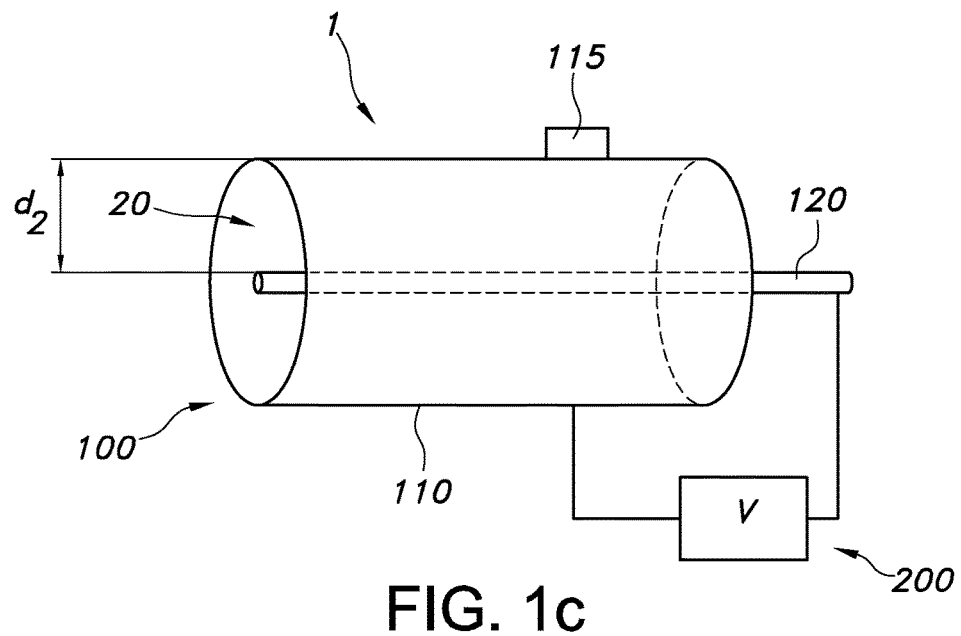

FIG. 1c schematically depicts an embodiment of a flow through heater (FTH), wherein the heater 100 is a heater through which the (aqueous) liquid 20 flows, while being heated. In the schematic embodiment of FIG. 1c, a heat generation device 115 is connected to the wall of the heater 100, and a rod within the heater is used as counter electrode 120. The wall is connected to an generation device 115 to heat the wall and is preferably of (stainless) steel; the wall is in contact with the (aqueous) liquid (not depicted) and is thus used as heating element 110. The counter electrode 120 may comprise a material as indicated in the description above for FIG. 1b. The heating element 110 and the counter electrode 120 have a (mutual) distance d2, which may e.g. be in the range of 0.5-5 mm.

Optionally, the circumferential heating element and the counter electrode may be arranged the other way around, with the counter electrode enclosing the heating element (this embodiment is not depicted).

Figure 1D:
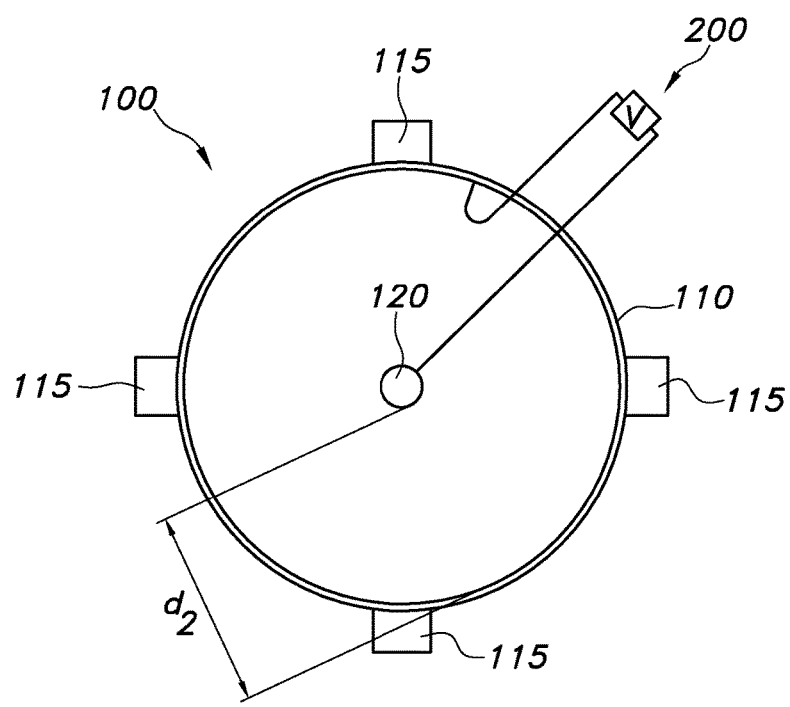

FIG. 1d schematically depicts substantially the same embodiment as schematically depicted in FIG. 1c, but now in cross-sectional view. Elements 115 heat wall of the heater 100. Therefore, the wall is indicated as heating element 110. Over this wall, i.e. heating element 110, and the counter electrode 120, a voltage is applied with electrical power supply 200. Here, the wall is used as heating element 110, and is preferably of (stainless) steel. The counter electrode 120 may comprise a material as indicated in the description above for FIG. 1b.

Figure 2A:
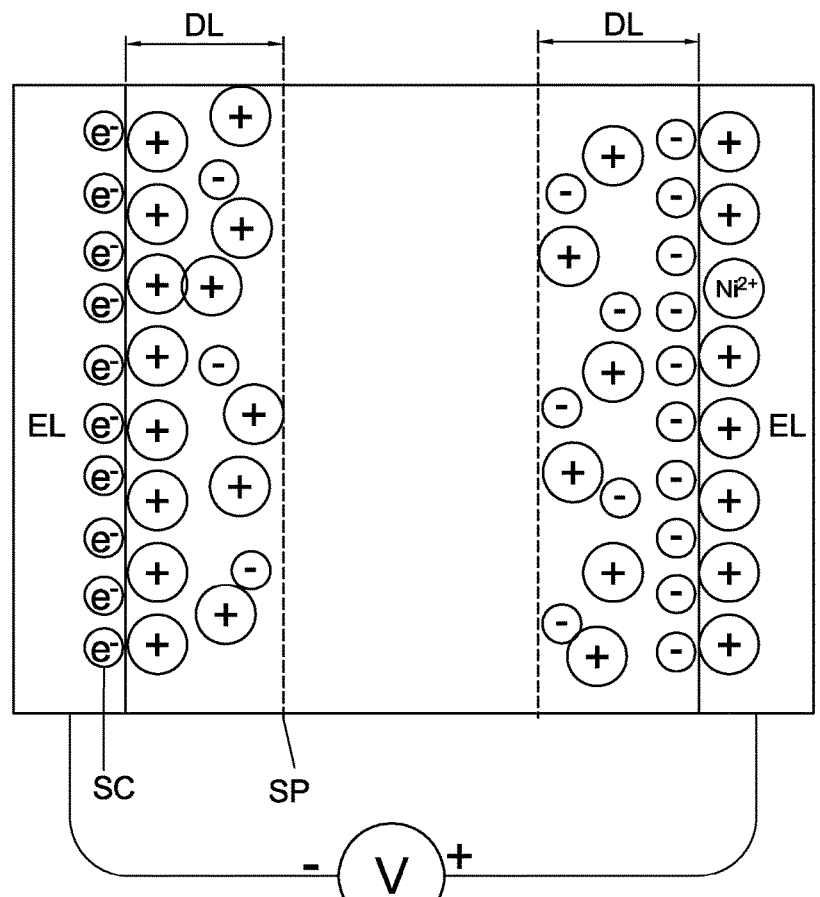
FIGS. 2a-2e schematically depict some examples of the electrochemistry and AC voltages.

A basic idea behind the AC signal is that corrosion is suppressed by preventing metal ions to move from the electrode into solution. When the signal is positive, metal ions tend to leave the electrode into the water (corrosion). When the signal is sufficiently fast reversed the metal ions are pulled back to the electrode. When the reversal is fast enough ions cannot escape the boundary layer at the metal surface and corrosion is prevented. FIG. 2a schematically depicts two electrodes, like the heating element and the counter electrode. The electrodes are indicated with EL. When an AC voltage is applied, there will be surface charge SC formed, which changes in sign continuously because of the AC character. In the vicinity of the electrodes, there will be an electrical double layer, indicated with DL. The dashed line indicates the slipping plane SP that separates mobile fluid from fluid that remains attached to the surface.

Figure 2B:
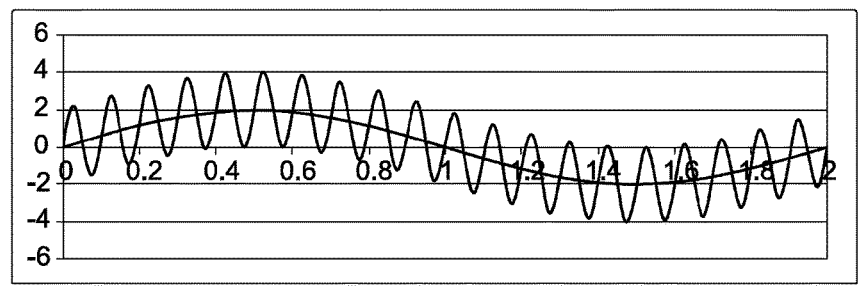

FIG. 2b shows a solution by way of reference, wherein a slow AC is modulated with a fast AC. Although the addition of a high frequency signal can suppress the corrosion of a single low frequency AC signal there is a drawback. The second AC signal needs to have certain amplitude to be effective. That means that when for example the amplitudes of both AC signals are equal that at the peak of the low frequency signal the amplitude is modulated by the second frequency bringing it down to 0V in the minimum but doubles it at the maximum (FIG. 2b). The doubling (in this example) of the amplitude can then result again in corrosion in spite of the second AC signal being present that could have prevented this corrosion due to the peak amplitude exceeding corrosion threshold.

Hence, another solution is sought, of which some aspects are described in FIGS. 2c-2e, and 3a-3c.

Figure 2C:
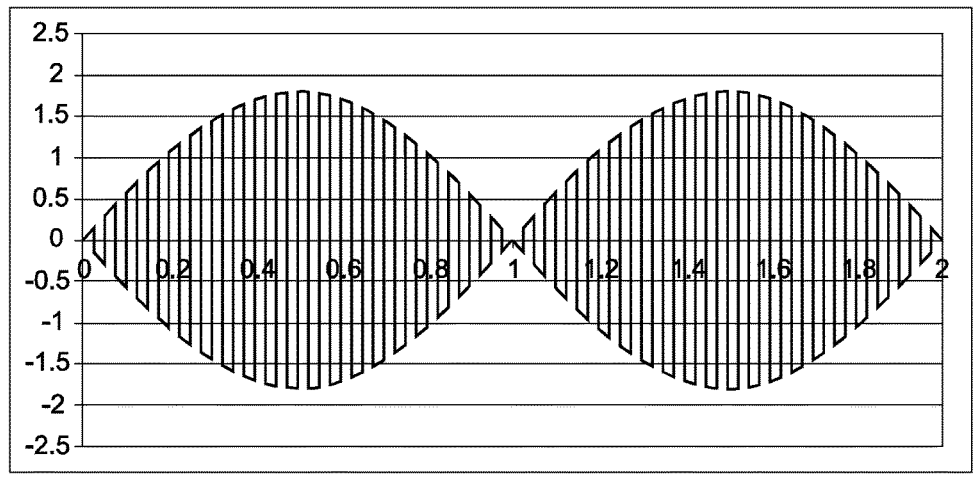
Figure 2D:
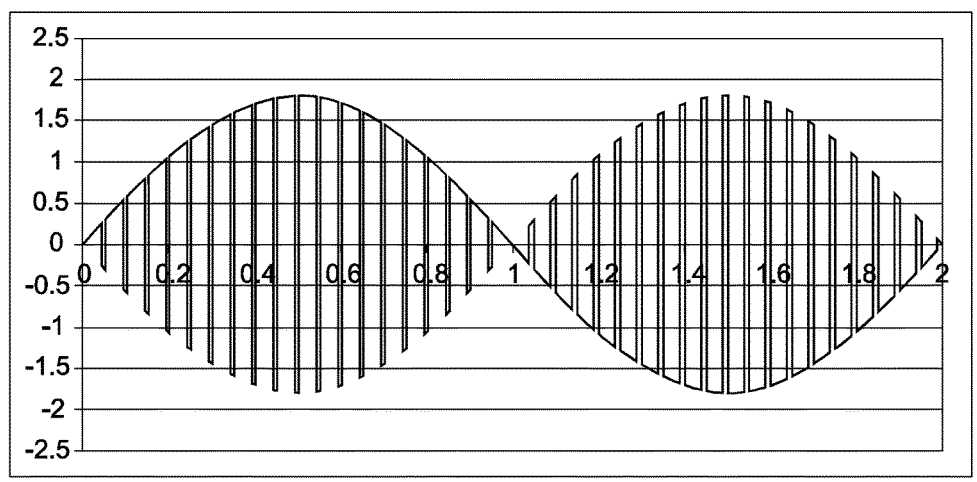
Figure 2E:
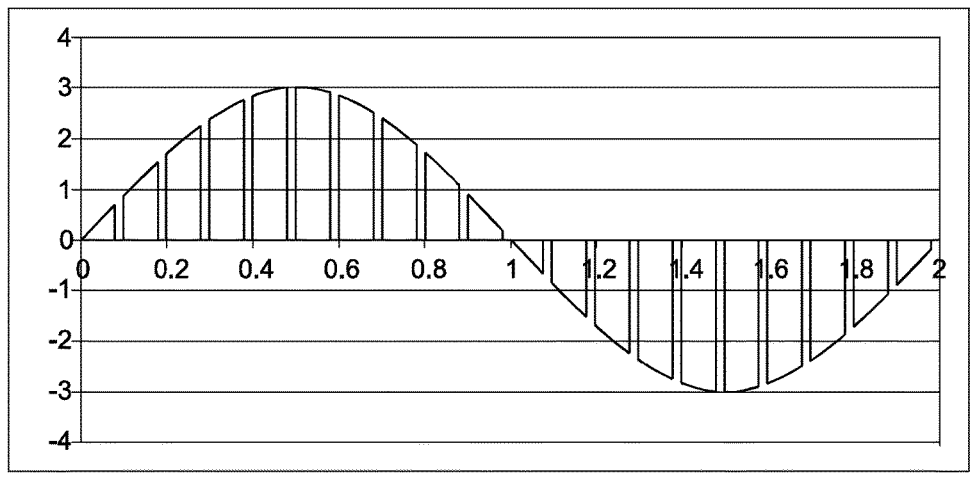

FIG. 2c is showing a pulse modulated AC signal with duty cycle of 50% at both at positive and negative part of the SC signal. Hence, 50% of the time the signal does not follow the "normal" sine, but deviates therefrom (due to a pulse that—in this embodiment—swaps the signal). FIG. 2d shows a pulse modulated signal where the positive part is modulated at 90% and the negative part at 75%. The duty cycle in the first part is 90% and the duty cycle in the second part is 75%. Hence, in the first part 10% of the time the signal does not follow the "normal" sine (only evaluating the first part of the cycle), but deviates therefrom (due to a pulse that—in this embodiment—swaps the signal); likewise in the second part 25% of the time the signal does not follow the "normal" sine (only evaluating the second part of the cycle), but deviates therefrom (due to a pulse that—in this embodiment—also swaps the signal). Here, a mean duty cycle may be 82.5%. FIG. 2e shows a pulse modulated signal where the reversal is not 100%

Figure 3A:
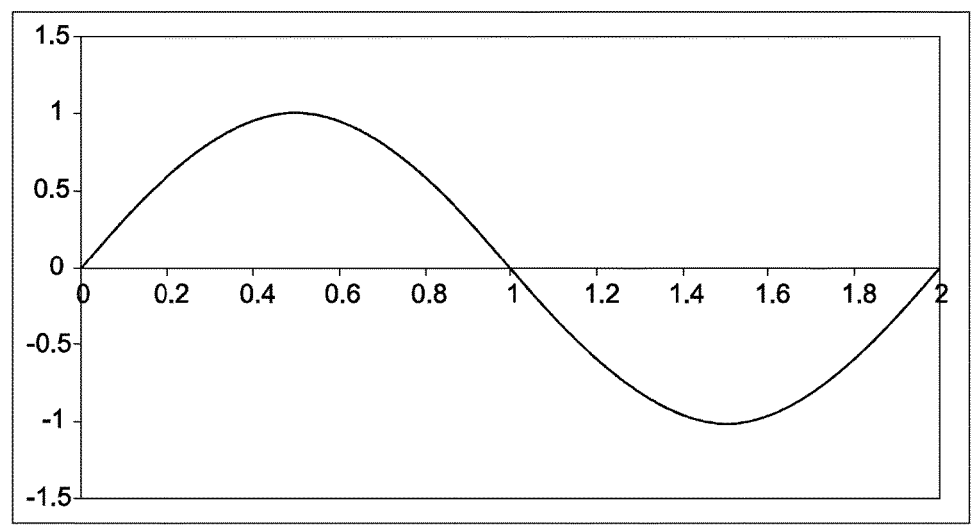
FIGS. 3a-3c schematically depicts an embodiment of an AC voltage comprising two components.
Figure 3B:
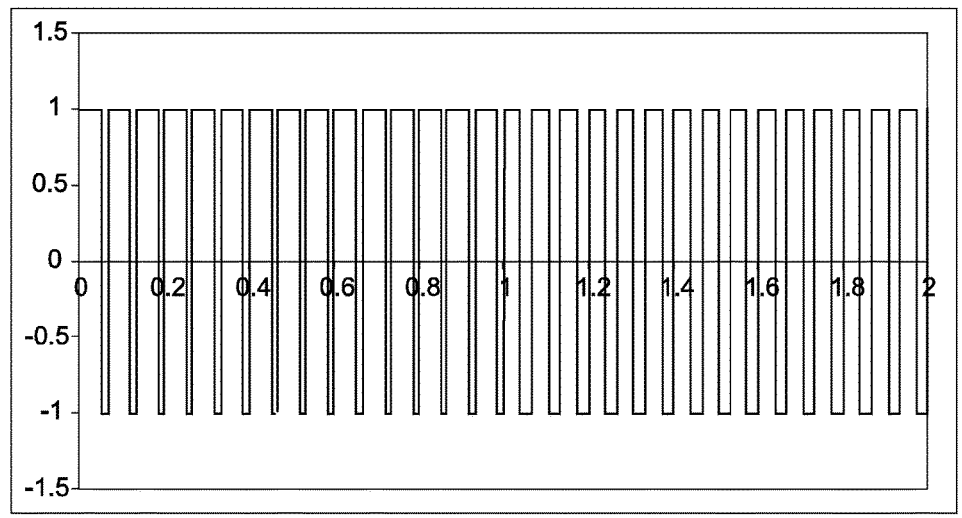
Figure 3C:
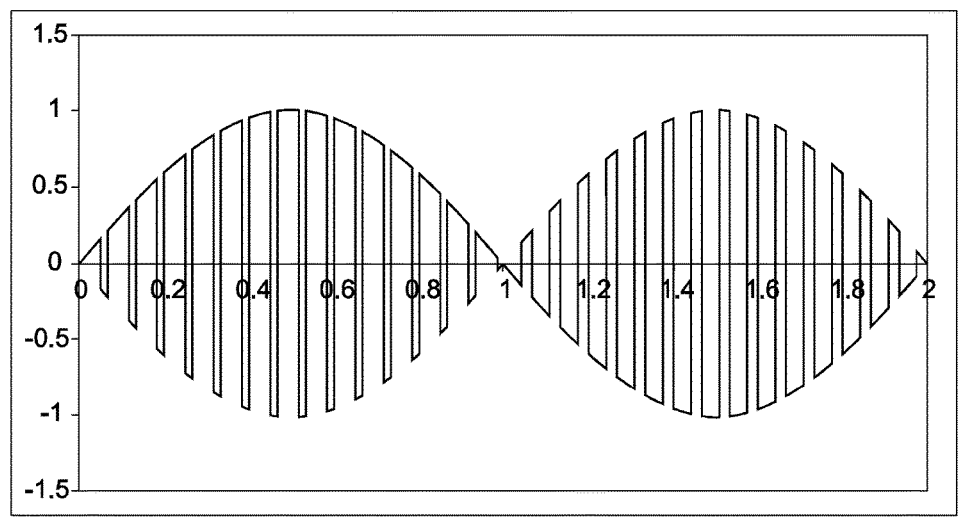

FIG. 3a schematically depicts a sine wave as example of an AC voltage. This can be a component of the AC potential difference. The frequency (f) is 0.5 Hz, the cycle time is 2 s, and the amplitude is 1 (by way of example 1 V). FIG. 3b schematically depicts an embodiment of a pulse width modulation (signal). Here, as frequency (fp) 15 Hz is chosen. The modulation factor (mf) is −1. This does not exclude that in principle part of the signal may also be modulate with a modulation factor mf in the range of $0 \geq mf \geq 1$ (or even larger). However, as will be clear to a person skilled in the art, when mf=1, there is no modulation. Further, by way of example the modulation is chosen such that the effective time in the positive part of the signal, here the first part is 80%; in the second part is 60%. When such modulation of FIG. 3b is applied to the sinusoidal AC voltage of FIG. 3a, the AC potential difference of FIG. 3c is obtained. This AC potential difference has an AC component, as well as temporary changes in signal. Note that here the modification factor is −1 (and +1), however, also a value different to −1 (or a value different to +1), such as −0.75 might be chosen.

Figure 4A:
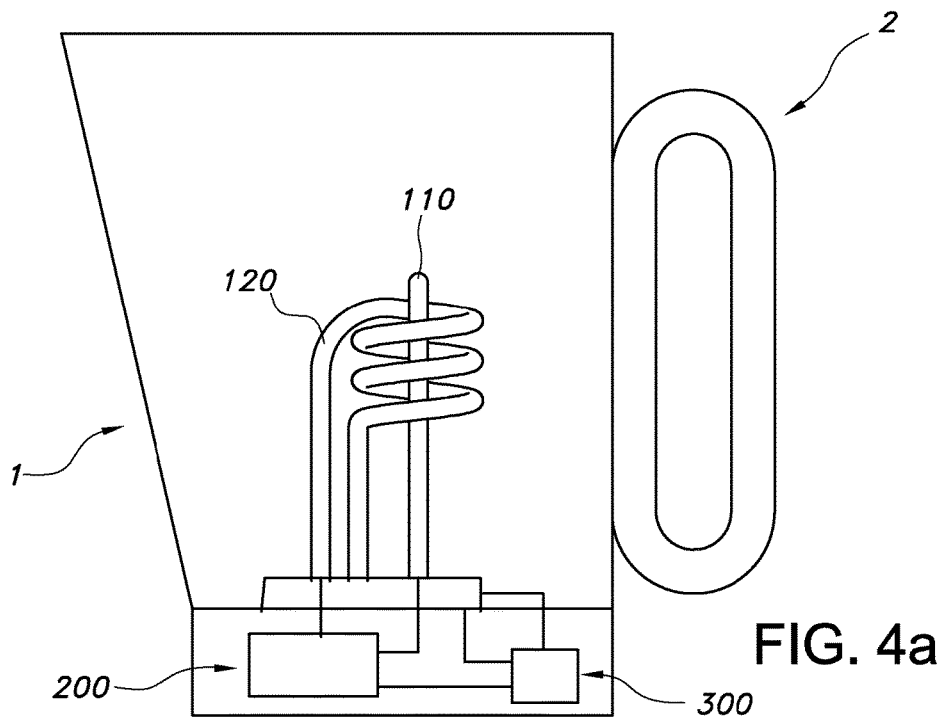
FIGS. 4-4b schematically depict some examples of electronic devices.
Figure 4B:
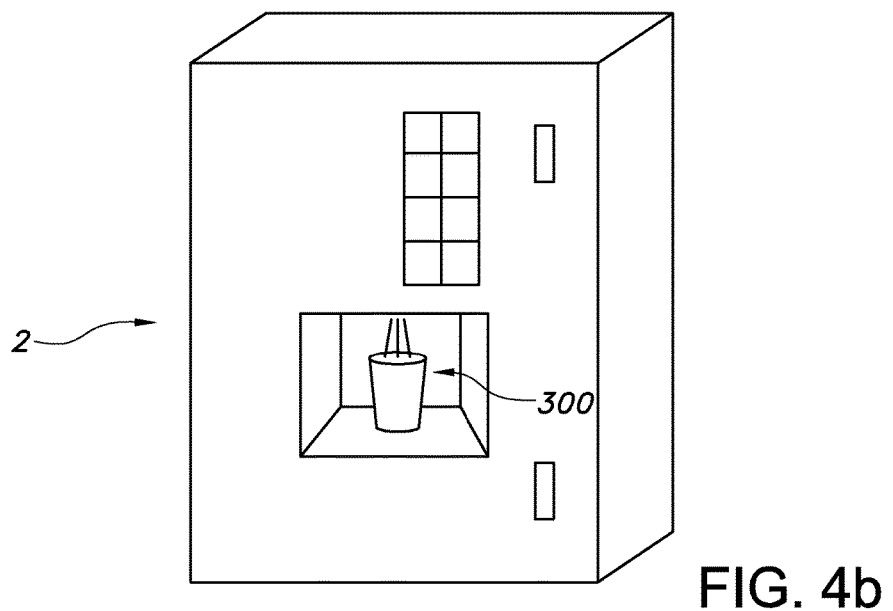

FIG. 4a schematically depicts an electronic device 2. FIG. 3 schematically depicts an electric kettle as example of the electronic device 2. The electronic device 2 comprises the heater arrangement 1. Here, electronics 300 may be arranged to control the heating of heating element 120 and provide power to the electric power supply 200 for imposing the AC and the temporary sign (and optional value) change of the AC to the heating element 120 and counter electrode 110. FIG. 4b schematically depicts an example of a vending machine as example of an electronic device 2. Reference 300 indicates a beverage.

The heater arrangement 1 may further comprise a sensor (not depicted) to sense parameters like conductivity of the (aqueous) liquid, the temperature of the (aqueous) liquid, etc. Further, the heater arrangement 1 may further comprise a controller, to control the one or more features of the AC and the temporary sign change of the potential difference. The controller may control those one or more features in dependence of the one or more parameters and one or more predefined relations between the one or more parameters and the one or more features.

EXAMPLES

Water Preparation

Stock solutions of $CaCl_2.2H_2O$ (65.6 gr/ltr), $MgSO_4.7H_2O$ (38 gr/ltr) and $NaHCO_3$ (76.2 gr/ltr) were made. Standard hard water was made by mixing 50 gram of each stock solution into 9 liter of de-ionized water and adding up to 10 liter. The resulting water had a total hardness of 16.8 °DH and a temporary hardness of 11.2 °DH. Total hardness is defined as 2.8×2×[mmol/ltr Ca+mmol Mg/ltr]. Temporary hardness is defined as 2.8×[mmol $HCO_3^-$/ltr]

Corrosion Experiments (Low Temperature)

In the following examples the effect of various parameters is shown especially on the corrosion of the electrodes when the amplitude is increased. In a typical experiment two stainless steel electrodes (316 grade) of 2.5 and 6 mm diameter were immersed in a beaker filled with standard hard water. Water was heated to 75° C. and an electrical signal was applied across the electrodes. Current was run for 30 minutes and electrodes inspected visually.

Experiment 1

A sinusoidal AC signal of 3V and 0.5 Hz was applied across the two electrodes. Severe corrosion occurred at both electrodes.

Experiment 2

An AC signal of 3V and 0.5Hz was modulated with 100 Hz at 80% duty cycle and applied on the two electrodes as in previous experiment. After 30 min the electrodes were visually inspected. The small (2.5 mm) electrode showed a weak yellow cast while the 6 mm electrode was colorless.

Experiment 3

An AC signal of 3V and 0.5 Hz was modulated with 100 Hz at 85% duty cycle and applied on the two electrodes as in previous experiment. After 30 min the electrodes were visually inspected. The small (2.5 mm) electrode showed a weak yellow cast while the 6 mm electrode showed a small discoloration. Coloration of the 85% duty cycle was comparable to the 80% duty cycle of experiment 2

Experiment 4

An AC signal of 3V and 0.5 Hz was modulated with 100 Hz at 90% duty cycle and applied on the two electrodes as in previous experiment. After 30 min the electrodes were visually inspected. The small (2.5 mm) electrode had corroded and showed a deep yellow color. Also the larger 6 mm electrode was clearly yellow colored.

Experiments of above show clearly the effect of reversing the basis signal at a certain frequency in order to prevent corrosion and the effect of the duty cycle of the pulses.

Experiment 5

An AC signal of 3V and 0.5 Hz was modulated with 50 Hz instead of 100 Hz at 80% duty cycle and applied on the two electrodes as in previous experiment. After 30 min the electrodes were visually inspected. The small (2.5 mm) electrode was slightly yellow as was the 6 mm electrode. The discoloration was stronger than with the 100 Hz pulse.

Experiment 6

An AC signal of 3V and 0.5 Hz was modulated with 500 Hz at 80% duty cycle and applied on the two electrodes as in previous experiment. After 30 min the electrodes were visually inspected. Both electrodes now were clean and showed no sign of corrosion.

Experiment 7

An identical experiment with the duty cycle increased to 90% showed again a strong yellowing of the electrodes.

Experiment 8

An AC signal of 3V and 0.5 Hz was modulated with 100 Hz at 80% duty cycle and applied on the two electrodes. The signal was not 100% reversed but only to 0V. After 30 min the electrodes were visually inspected. The small (2.5 mm) electrode had severely corroded while the 6 mm electrode was yellow in color.

In experiments above, the reversing of the signal was more than 50% meaning that overall the signal was still resembling the original base signal. When the duty cycle is increased more than 50% the signal is in fact merely swopped.

Experiment 9

An AC signal of 3V and 0.1 Hz was modulated with 100 Hz at 80% duty cycle when in positive amplitude and with 100 Hz 20% when in negative amplitude. (The 2.5 mm electrode was connected to the positive terminal). The 2.5 mm electrode showed yellowing while the 6 mm electrode was clean. On top of that the 6 mm showed scale formation. The latter indicates that clearly water was decomposed as due to the duty cycles the 6 mm electrode was facing continuously a high pH giving rise to scale formation.

Experiment 10

An AC signal of 3V and 10 Hz was modulated with 100 Hz at 80% duty cycle when in positive amplitude and with 100 Hz 20% when in negative amplitude. (The 2.5 mm electrode was connected to the positive terminal). Now both electrodes showed no corrosion while there was still scale formation onto the 6 mm electrode.

Increasing base frequency diminished the corrosion while maintaining the water decomposition as indicated by the scale formation.

In previous experiments the base signal was sinusoidal. Similar behavior can be observed when the base signal is in the form of a block signal or a triangle.

Test Setup for a Flow Through Heater

The heater is schematically shown in the FIGS. 1c and 1d. The outer tube, first heating element 110, is a stainless steel tube with two heat generation devices 115 at both sides. The outer tube has a 15 cm length and a 13 mm inner diameter Together, they in fact form one heating element, surrounded by aluminum, with which the liquid is in contact when the liquid flows through the tube. The inner tube may also be of stainless steel, and had a larger diameter than schematically depicted in FIG. 1c/1d: as counter electrode 120 a stainless steel tube of 8 mm diameter was inserted in the tube. Water was passed through the area between the two stainless steel tubes at a speed of 2.25 ml/sec; the pressure in the heater system was 6-10 bar. Both the outer tube and the inner tube of the water heating system were connected electrically. A typical test cycle consisted of heating water for 70 seconds and cooling down for 50 seconds. This cycle was repeated for 500 times.

Comparative Experiment

Said (water) heater was used for testing the calcification by the two water types without any electrical signal applied across the two electrodes. In both cases especially the wall was fully calcified and a dense layer of scale was formed that was strongly adhering to the wall.

Experiment 11

A similar experiment as in the comparative experiment was run but now with a sinusoidal signal applied of 0.5 Hz and 1.6 V amplitude. The signal was reversed with 500 Hz; the duty cycle during the positive half of the sine is 80%, the duty cycle during the negative half 70%.

As a result of the experiment, the counter-electrode was clean of calc but slightly colored while the wall of the outside tube showed slight scale formation and pitting corrosion. The adhesion of the scale to the wall was weak and far less than in the comparative experiment.

Experiment 12

In a second experiment the signal reversal frequency was increased from 500 Hz to 1000 Hz. Slight scale formation was observed, comparable to experiment 11. Corrosion was less as in experiment 11 but still present.

Experiment 13

In a third experiment the signal reversal frequency is increased from 1000 Hz to 2000 Hz. No corrosion is observed, but a dense layer of calc remains, comparable to the amount of calc in the comparative experiment. Clearly the 2000 Hz frequency limits both oxidation of water and oxidation of metal.

In order to effectively prevent corrosion in the operating conditions as described above (high temperature), the duty cycle was lowered further.

Experiment 14

A test was performed with a 0.5 Hz sine, reversed with 1000 Hz with a duty cycle of 70% and 60% for the positive and negative half of the sine respectively. Still corrosion is observed.

Experiment 15

A test is performed with a 0.5 Hz 1.6V amplitude sine, reversed with 1000 Hz with a duty cycle of 50% and 50% for the positive and negative half of the sine respectively. Corrosion is effectively prevented. The amplitude can be increased up to 2.8V to enhance scale prevention while still avoiding corrosion.

From these experiments it can be concluded that at high heater wall temperatures the mobility of the (metal) ions is very high. In order to prevent metals ions from moving into the bulk of the water, a 50% duty cycle was necessary. It can also be concluded that at 1000 Hz the descaling action is still in operation; 2500 Hz may be too high for the electrochemistry to follow.

The invention claimed is:

1. A method for heating a liquid in a heater, wherein the heater comprises a heating element, the method comprising acts of:
    heating the liquid in the heater wherein the heating element is in contact with the liquid,
    applying a potential difference between the heating element and a counter electrode, wherein the potential difference has an AC component whereby the potential difference varies with an AC frequency (f) in the range of 0.01-100 Hz and wherein the potential difference is applied with a cycle time and a duty cycle, wherein the potential difference has a sign during a first part of the cycle time that is opposite of the sign of the potential difference during a second part of the cycle time, and
    modulating the AC component with a pulse that reverses the signal at a pulse frequency (fp) such that during one or more of the first part of the cycle time and the second part of the cycle time, the potential difference temporarily changes sign with a frequency in the range of 50-2500 Hz, wherein the pulse frequency (fp) and the frequency (f) of the AC component has a relation fp/f>2.

2. The method according to claim 1, wherein during one or more of the first part of the cycle time and the second part of the cycle time, the potential difference temporarily changes sign and absolute value.

3. The method according to claim 1, wherein fp/f>5, wherein the pulse modulation is chosen to modulate the amplitude of the AC signal with (i) a modulation factor (mf) in the range of $-2.5 \leq mf < 0$ and with (ii) a duty cycle in the range of $5\% \leq D \leq 95\%$.

4. The method according to claim 1, wherein during one or more of the first part of the cycle time and the second part of the cycle time the duty cycle is in the range of 35-65%.

5. The method according to claim 1, wherein the AC frequency (f) is the range of 0.1-50 Hz and wherein the potential difference is in the range of 1-5 V.

6. The method according to claim 1, comprising an act of heating the heating element to a temperature in the range of 120-250° C.

7. The method according to claim 1, comprising acts of flowing the liquid along the heating element with a flow speed in the range of 1.5-10 ml/s and controlling one or more of the potential difference (V), AC frequency (f), and duty cycle as function of one or more of (i) a current between the heating element and the counter electrode, and (ii) an electrical conductivity of the liquid.

8. The method according to claim 1, wherein the heater is configured to flow the liquid between the heating element and the counter electrode.

9. The method according to claim 1, wherein the heater comprises a flow through heater, wherein the heating element encloses the counter electrode.

10. The method according to claim 8, wherein the heating element and the counter electrode have a mutual distance (d2) in the range of 0.5-5 mm.

11. A heater arrangement comprising a heater, arranged for heating a liquid, comprising a heating element to heat the liquid in the heater, the heating element arranged to be in contact with the liquid, and an electrical power supply, wherein the heater arrangement is configured to apply a potential difference between the heating element and a counter electrode, wherein the potential difference has an AC component whereby the potential difference varies with an AC frequency (f) in the range of 0.01-100 Hz and wherein the potential difference is applied with a cycle time and a duty cycle, wherein the potential difference has a sign during a first part of the cycle time that is opposite of the sign of the potential difference during a second part of the cycle time, wherein the heater arrangement is further configured to apply a modulation to the AC component with a pulse that reverses the signal at a pulse frequency (fp) such that during one or more of the first part of the cycle time and the second part of the cycle time, the potential difference temporarily changes sign with a frequency in the range of 50-2500 Hz, and wherein the pulse frequency (fp) and the frequency (f) of the AC component has a relation fp/f>2.

12. The heater arrangement according to claim 11, wherein fp/f>5, wherein the pulse modulation is chosen to modulate the amplitude of the AC signal with (i) a modulation factor (mf) in the range of $-2.5 \leq mf < 0$ and with (ii) a duty cycle in the range of $5\% \leq D \leq 95\%$.

13. The water heating arrangement according to claim 11, wherein the heater is configured to flow the liquid between the heating element and the counter electrode, and wherein the heater comprises a flow through heater, wherein the heating element encloses the counter electrode.

14. An electronic device for providing a beverage comprising a liquid at elevated temperature, the electronic device comprising a heater arrangement according to claim 11, wherein the electronic device is arranged to produce heated water and/or steam for the beverage.

15. A method for heating a liquid in a heater, wherein the heater comprises a heating element, the method comprising acts of:
    heating the liquid in the heater wherein the heating element is in contact with the liquid,
    applying a potential difference between the heating element and a counter electrode, wherein the potential difference has an AC component whereby the potential difference varies with an AC frequency (f) in the range of 0.01-100 Hz and wherein the potential difference is applied with a cycle time and a duty cycle, wherein the potential difference has a sign during a first part of the cycle time that is opposite of the sign of the potential difference during a second part of the cycle time, wherein during one or more of the first part of the cycle time and the second part of the cycle time, the potential difference temporarily changes sign with a frequency in the range of 50-2500 Hz, and wherein during one or more of the first part of the cycle time and the second part of the cycle time the duty cycle is in the range of 35-65%.

16. A method for heating a liquid in a heater, wherein the heater comprises a heating element, the method comprising acts of:

heating the liquid in the heater wherein the heating element is in contact with the liquid, applying a potential difference between the heating element and a counter electrode, wherein the potential difference has an AC component whereby the potential difference varies with an AC frequency (f) in the range of 0.01-100 Hz and wherein the potential difference is applied with a cycle time and a duty cycle, wherein the potential difference has a sign during a first part of the cycle time that is opposite of the sign of the potential difference during a second part of the cycle time, wherein during one or more of the first part of the cycle time and the second part of the cycle time, the potential difference temporarily changes sign with a frequency in the range of 50-2500 Hz, wherein the heater is configured to flow the liquid between the heating element and the counter electrode and wherein the heating element and the counter electrode have a mutual distance (d2) in the range of 0.5-5 mm.

17. A heater arrangement comprising a heater, arranged for heating a liquid, comprising a heating element to heat the liquid in the heater, the heating element arranged to be in contact with the liquid, and an electrical power supply, wherein the heater arrangement is configured to apply a potential difference between the heating element and a counter electrode, wherein the potential difference has an AC component whereby the potential difference varies with an AC frequency (f) in the range of 0.01-100 Hz and wherein the potential difference is applied with a cycle time and a duty cycle, wherein the potential difference has a sign during a first part of the cycle time that is opposite of the sign of the potential difference during a second part of the cycle time, and wherein during one or more of the first part of the cycle time and the second part of the cycle time, the potential difference temporarily changes sign with a frequency in the range of 50-2500 Hz, and wherein during one or more of the first part of the cycle time and the second part of the cycle time the duty cycle is in the range of 35-65%.

18. A heater arrangement comprising a heater, arranged for heating a liquid, comprising a heating element to heat the liquid in the heater, the heating element arranged to be in contact with the liquid, and an electrical power supply, wherein the heater arrangement is configured to apply a potential difference between the heating element and a counter electrode, wherein the potential difference has an AC component whereby the potential difference varies with an AC frequency (f) in the range of 0.01-100 Hz and wherein the potential difference is applied with a cycle time and a duty cycle, wherein the potential difference has a sign during a first part of the cycle time that is opposite of the sign of the potential difference during a second part of the cycle time, and wherein during one or more of the first part of the cycle time and the second part of the cycle time, the potential difference temporarily changes sign with a frequency in the range of 50-2500 Hz, wherein the heater is configured to flow the liquid between the heating element and the counter electrode and wherein the heating element and the counter electrode have a mutual distance (d2) in the range of 0.5-5 mm.

* * * * *